Jan. 4, 1966    R. A. MARSEN    3,227,978
TURRET TURNER HAVING CHANNEL STRIPS CARRYING MINIMAL SIZE
INCREMENTAL INDUCTORS FOR SERIES CONNECTION
WITH CHASSIS MOUNTED PRINCIPAL INDUCTOR
Filed May 23, 1960    4 Sheets-Sheet 1

Jan. 4, 1966 R. A. MARSEN 3,227,978
TURRET TURNER HAVING CHANNEL STRIPS CARRYING MINIMAL SIZE
INCREMENTAL INDUCTORS FOR SERIES CONNECTION
WITH CHASSIS MOUNTED PRINCIPAL INDUCTOR
Filed May 23, 1960 4 Sheets-Sheet 2
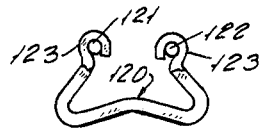
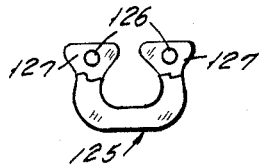
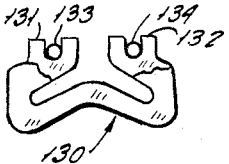
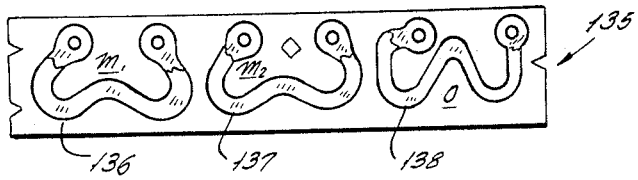
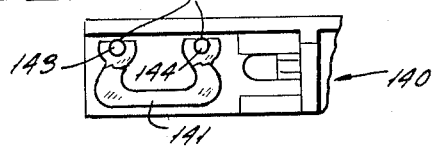
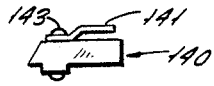
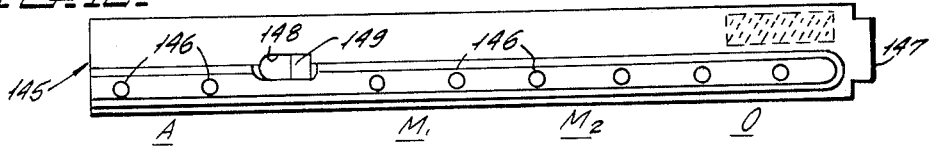
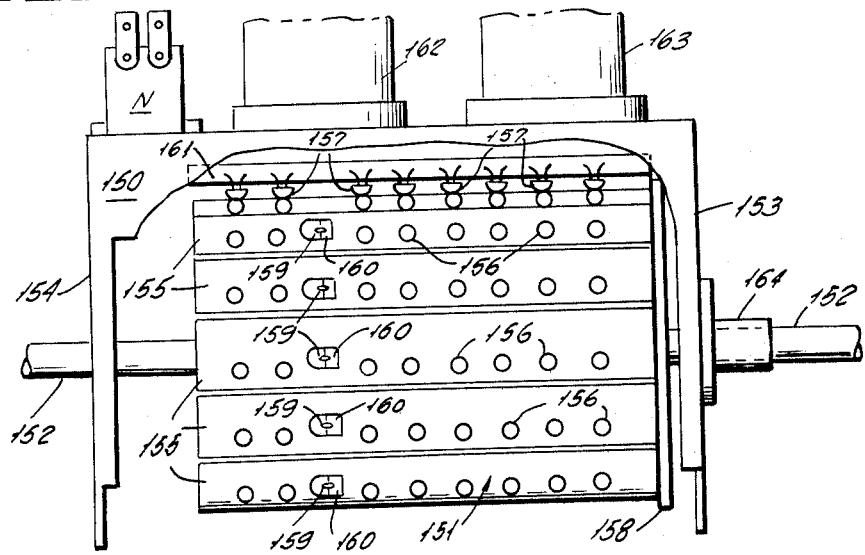

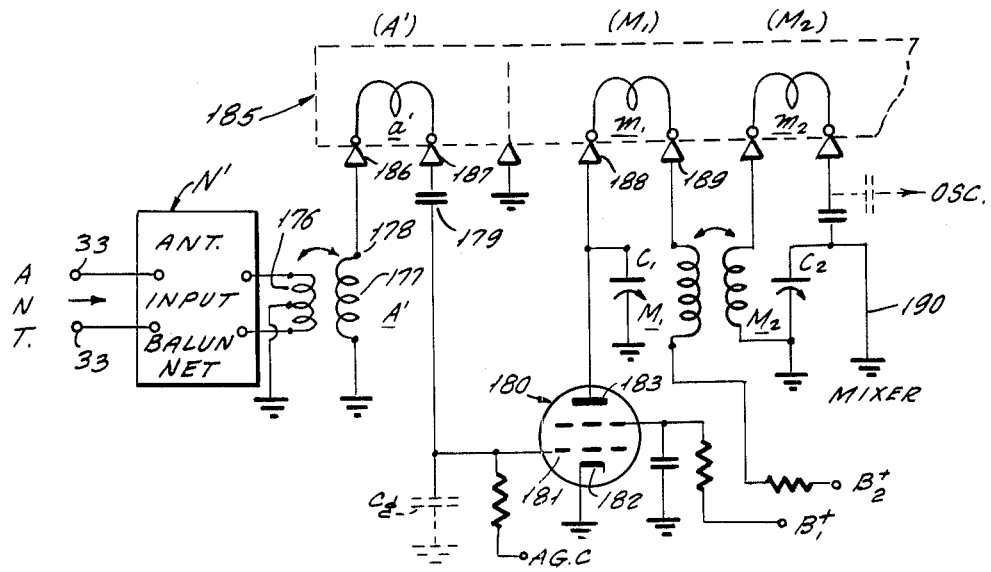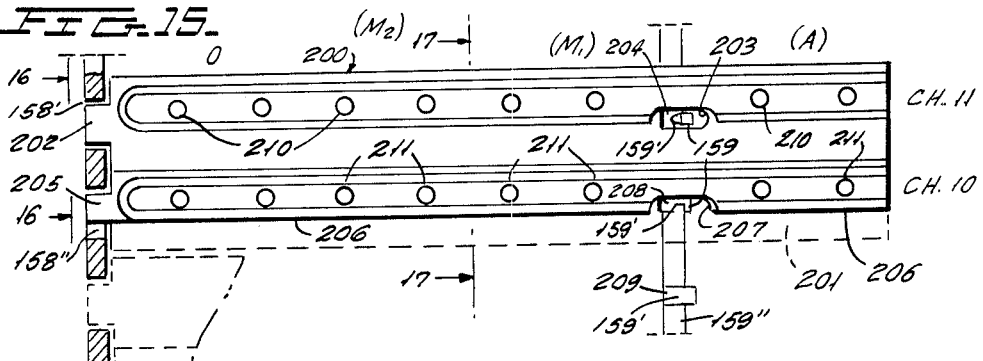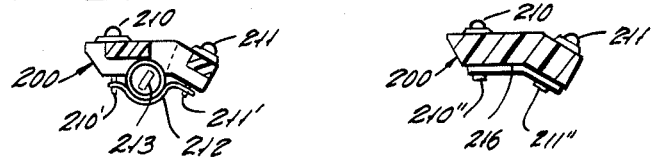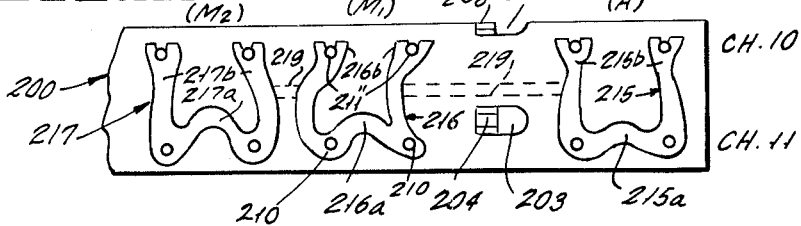

Jan. 4, 1966 R. A. MARSEN 3,227,978
TURRET TURNER HAVING CHANNEL STRIPS CARRYING MINIMAL SIZE
INCREMENTAL INDUCTORS FOR SERIES CONNECTION
WITH CHASSIS MOUNTED PRINCIPAL INDUCTOR
Filed May 23, 1960 4 Sheets-Sheet 4
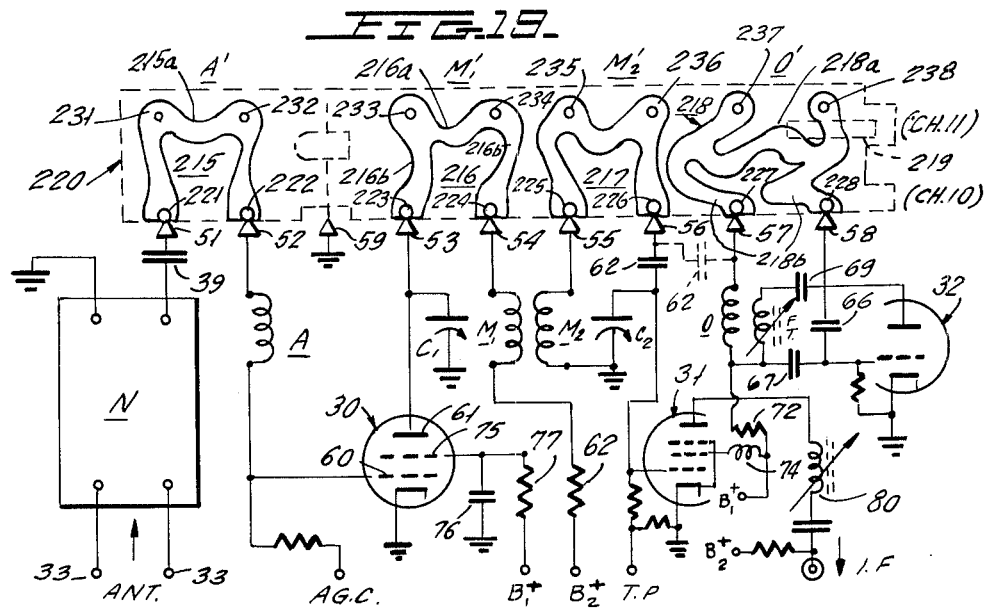
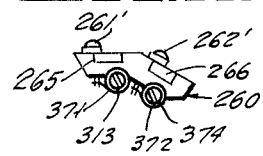
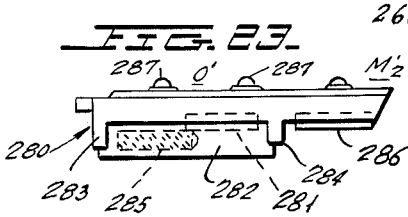
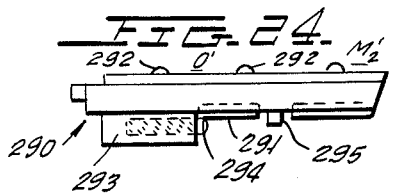
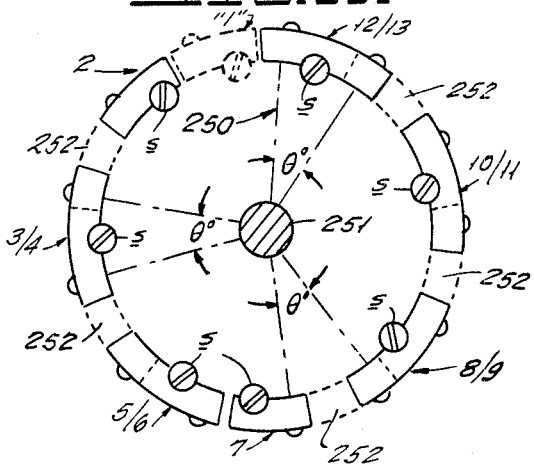
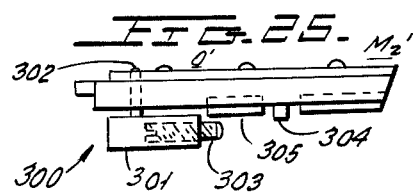

United States Patent Office 3,227,978
Patented Jan. 4, 1966

3,227,978
TURRET TUNER HAVING CHANNEL STRIPS CARRYING MINIMAL SIZE INCREMENTAL INDUCTORS FOR SERIES CONNECTION WITH CHASSIS MOUNTED PRINCIPAL INDUCTOR
Richard A. Marsen, Oak Hill Road, Middletown, N.J.
Filed May 23, 1960, Ser. No. 31,009
3 Claims. (Cl. 334—50)

This invention relates to television tuners or channel selectors and more particularly relates to novel circuit and panel constructions for such tuners of the turret type.

Turret tuners contain a series of circuit panels arranged about a drum for individual connection to the fixed tuner circuitry. Each panel contains independent tuning elements such as coils, to establish the panel's tuning-in of a particular broadcast channel when selectively connected into the fixed tuner circuit. One widely used panel arrangement contains several coils wound upon one or two coil forms longitudinal of the panel, with a row of contacts connected to each coil end, as shown in Patent Nos. 2,496,183 and 2,545,681. Another system employs flat coils of which Patent No. 2,611,807 is typical.

In accordance with my present invention a basic coil or inductance for each of one or more of the tuner tuning sections is inserted in the fixed circuit, with the corresponding panel inductance being connected in series therewith when in the selection position. Each panel then contains only the incremental inductances needed, in addition to the fixed coils, to establish its tuning.

The advantages of the present invention are most significant for the seven upper band panels, for channels 7 to 13. In a typical VHF tuner using the invention, the equivalent of only one or at most two coil turns of inductance are needed at all circuit positions thereof. The reason for such small differential inductances in this upper frequency region is the smaller percentage each channel band (6 mc.) bears to the channel frequency itself (174 to 216 mc.). Such individual panels may thereby be constructed with flat pretinned preforms in place of the usual coils for each channel. Materially simplified turret panel construction results, and at substantially lower cost. Also such preforms can be accurately formed, with little crimping or trimming needed in production. The increment inductor system of the present invention is more accurate than prior tuning systems in that its tuning effects are individual, not cumulative between channels. Each panel is independent of the other's tuning or accuracy, and one panel does not affect the others successively down a channel tuning chain.

Another important feature of my present invention is the reduction of the number of individual panels and their overall cost for a turret tuner, to selectively tune-in all the VHF channels. In one embodiment five dual (adjacent channel) panels together with two single channel panels tune the twelve VHF stations individually. The invenion dual panels are considerably narrower than the two single turret panels they replace, and are made to readily fit into the usual turret mounting for the respective two single panels. The dual panels of the invention derive all the advantages of the incremental inductance system of the single panel embodiment described hereinabove. The fixed coils in the tuner chassis tunable circuits enable the use of small incremental inductors for the higher of the two adjacent channels of the dual panels. The lower channel tuning is established by short inductive arms or links with the associated of the said incremental inductors.

The exemplary dual panels use novel flat dual composite preforms inserted between panel contact sets for accurate fabrication to tune-in their two channels. In manufacturing the invention dual panels there are substantial savings in material, assembly, adjusting and testing operations on a per twelve-channel panel basis. One oscillator adjusting slug is adequate, as both adjacent channels are closely and accurately related. For some applications, as remote motorized tuning, two individual oscillator slugs are used in the dual panels.

It is accordingly a primary object of the present invention to provide novel improved tuning panel systems for television turret tuners.

Another object of the persent invention is to provide novel tuning panels for television turret tuners of simplified construction.

A further object of the present invention is to provide novel turret tuners with circuit panels constructed on an incremental inductance basis with substantially reduced wire and material requirement.

Still another object of the present invention is to provide novel circuit panels for television VHF turret tuners with flat preformed inductors.

Still a further object of the present invention is to provide novel television turret tuners containing dual channel panels using dual inductor components preformed in flat assemblies.

Still another object of the present invention is to provide novel dual panels for VHF turret tuners with full tuning for two adjacent channels at substantial savings in comparison with two individual panels.

These and further objects of this invention will become more apparent from the following description of exemplary embodiments thereof, taken in connection with the drawings, in which:

FIGS. 6 to 9 are plan views of exemplary increment inductors for the invention turret panels.

FIGS. 10 and 11 are respective interior plan and end views of a portion of a turret panel constructed with the increment inductor of FIG. 7.

FIG. 12 is an exterior plan view of a turret panel.

FIG. 13 is an end elevational view of a typical turret tuner for utilizing the invention system.

FIG. 14 is a diagram of a modified portion of the circuit of FIG. 1.

FIG. 15 is an exterior plan view of an exemplary dual panel in accordance with the present invention.

FIGS. 16 and 17 are respective cross-sectional views taken along the lines 16—16 and 17—17 of FIG. 15.

FIG. 18 is a plan interior view of the dual panel of FIG. 15, illustrating the principles and construction thereof.

FIG. 19 is a schematic circuit diagram illustrating the dual panel invention system hereof.

FIG. 20 is a diagram of the exemplary dual panel array in a VHF turret drum.

FIGS. 21 and 22 are respective top exterior and side views of a modified dual panel construction.

FIGS. 23 to 25 are side elevational views of alternate forms for the oscillator section end of the invention panels.

Figure 1:
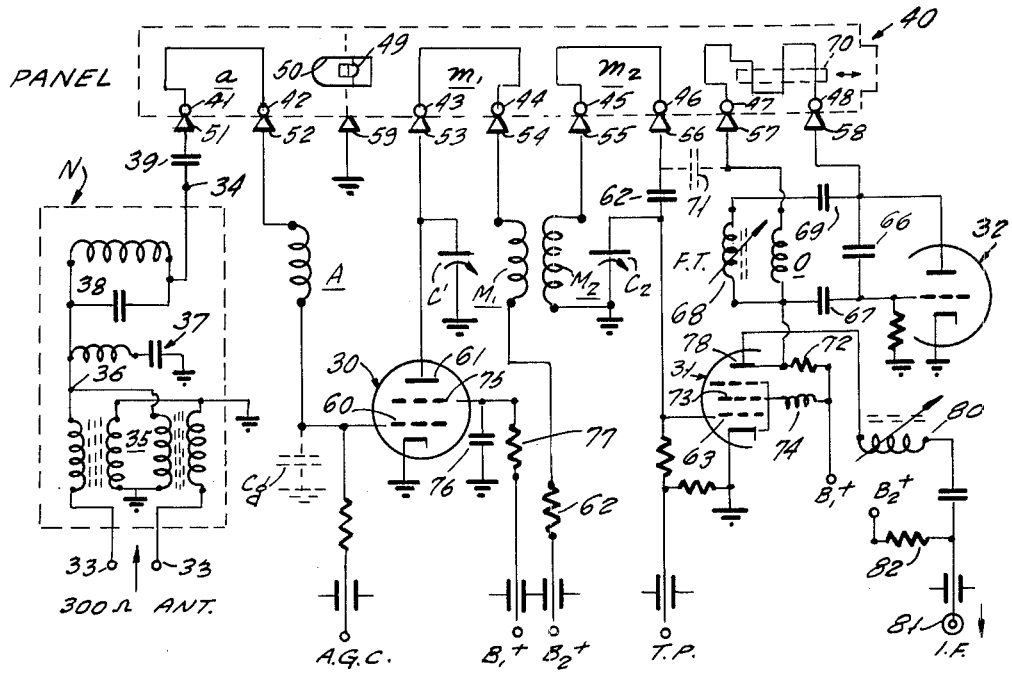
FIG. 1 is a schematic circuit diagram of an exemplary turret tuner with a set of fixed coils that are selectively tuned with panel increment inductances in accordance with the invention.

Referring to FIG. 1, a VHF television turret tuner circuit is shown with a tetrode RF amplifier tube 30, a pentode mixer 31 and triode oscillator 32. Tube sections 31 and 32 may be combined in one envelope. Other tube types may be used for these, as is understood by those skilled in the art. The VHF antenna lead-in is connected to terminals 33 of an antenna input circuit network, indicated by dotted rectangle N. Circuit N is designed for balanced input (at 33) to unbalanced output at terminal 34 for input to the single-ended RF amplifier stage. A balun transformer 35 of conventional form has its input connected to antenna terminals 33 and its output lead 36 to terminal 34 through typical IF series trap 37 and parallel trap 38.

The output 34 of antenna input network N connects to a coupling condenser 39 for a series-input type of RF circuit. The turret panel indicated by dotted rectangle 40 represents any one of the several exemplary panels selectively connected into the fixed tuner circuit. Each panel 40 contains a longitudinal array of contacts 41 through 48 for coaction with a fixed set of wipers 51 through 58. A spring clip or finger 49 of the turret drum grips the panel 40 at its aperture 50 (see FIG. 13). The engaged finger 49 is grounded through wiper 59, and the disc body with the fingers 49 act as a grounded shield between the antenna input section of the panel circuitry and its other sections.

Panel 40 contains four increment inductances $a$, $m_1$, $m_2$ and $o$. Increment $a$ is connected between panel contacts 41 and 42. Fixed wipers 51, 52 connect increment inductance $a$ in series between coupling condenser 32 and a fixed antenna RF input coil A, and in turn to the control grid electrode 60 of RF amplifier 30. Increment inductance $a$ completes the otherwise fixed RF input circuit to the grid electrode 60, and is proportioned to add the amount of inductance into the otherwise fixed amount to tune the RF input to the desired channel. The inherent capacitance $C_g$ of the control grid 60 to ground is involved in the RF input circuit optimized design, as is well known in the art.

Figure 2:
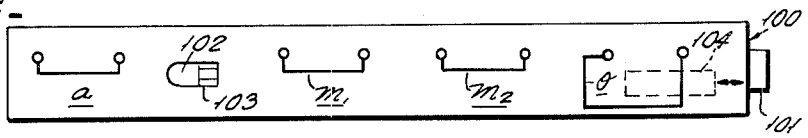
FIGS. 2 to 5 illustrate exemplary turret tuner panels with inductance increments for several channel types.

In the exemplary tuner, the proportioning of the inductance of fixed coil A is made to provide optimum tuning of the RF input circuit (to grid 60) for channel 13 (highest VHF channel, namely from 210 to 216 mc.). The preferred increment inductance $a$ for the channel 13 panel is thus only in the form of a short link of low inductance between contacts 41, 42, as illustrated in FIG. 2 and hereinafter set forth. However, it is not necessary for the channel 13 panel to have such low inductance link ($a$), in which event the coil A may be made somewhat smaller. The inductance of coil A in a typical VHF turret tuner circuit may be of only a few turns in the range of 4 to 8, depending on the RF tube type used, its wire size, its coil diameter, length of the fixed leads to and from the wipers 51, 52, the wiper dimensions, capacity added to the RF circuit, etc., as will now be understood by those skilled in the art.

An important feature of my invention is the use of an incremental inductance $a$ in the panel section that is to be connected in series with the fixed A coil, thereby adding its predetermined inductance incrementally to the antenna circuit therewith and determining the optimum RF input tuning for the frequency of the channel it represents (over its six megacycle band-width). It is to be understood that each channel, successively lower in frequency is tuned-in at RF by a corresponding incremental inductor ($a$) of somewhat larger inductance value than that of the preceding one.

The successive panels for the respective channels each therefor contain an RF input ($a$) increment of inductance specifically proportioned for itself to be directly added to the fixed inductance (A) of the RF input circuit, to in turn tune-in the corresponding chanel at the optimum condition. Should the RF input circuit instead have the fixed coil A in a parallel circuit configuration rather than the illustrated series one, or contain an antenna transformer as described in connection with FIG. 14 hereinafter, the principle of the increment inductors ($a$) for each panel herein described still applies. The increments ($a$) are still connected in series with the RF coil coupled to the RF control grid 60, in such conditions. An important factor is that the stationary tuner tunable sections (coil A and $C_g$ herein), contain a substantial percentage of the inductance for tuning-in the higher VHF channels.

The successive panel incremental inductor feature of the present invention is advantageously applied also the two two interstage sections of the tuner. Fixed output coil $M_1$ of the RF amplifier 30 is connected to the anode 61 in series with the incremental inductor $m_1$ through its contacts 43, 44 and wipers 53, 54. The anode supply potential is connected from $B_2+$ through dropping resistor 62 and coil $M_1$ and indicator $m_1$. A trimmer condenser $C_1$ is in circuit parallel with both inductances $M_1$ and $m_1$, the latter in series-add connection. Condenser $C_1$ connects between anode 61 and ground, and tunes with the total inductance to the selected channel frequency.

Increment inductor $m_1$ on each panel 40 is proportioned to add just enough inductance to the fixed $M_1$-$C_1$ parameters, to determine the optimum tuned condition for the RF stage 30 output for the respective channels. In an exemplary turret tuner, with a coil $M_1$ of about three turns, the increment inductors ($m_1$) for each of the panels for channels 7 through 13 are small preforms each with an equivalent of one coil turn or less of inductance; which inductances are incrementally different for the successive channels for the optimum tuning. For the lower channel panels 2 through 6, as many as 8 to 16 turns may be required. Stamped coils may be used, or the conventional coils, in the lower channel panels. Nevertheless the number of turns needed, their space, and material requirement are lowered for even such panels as compared to prior art panels.

In a similar manner the interstage secondary or mixer input circuit comprises a fixed coil $M_2$, that is suitably coupled or otherwise located near coil $M_1$ in the fixed chassis. The mixer input turner circuitry hereof further comprises an incremental inductor $M_2$ in panel 40 connectable in series with fixed coil $M_2$ through its contacts 45, 46 and wipers 55, 56. A blocking condenser 62 is used in view of the external test-point connection T.P. to the input grid 63 of mixer 65. Tuning trimmer condenser $C_2$ is in parallel with coil $M_2$ through increment $m_2$.

The selected inductor $m_2$ determines the optimum tuning of the $M_2C_2m_2$ combination for the corresponding channel. The coupling between the interstage circuits is established at $M_1$-$M_2$ for the upper channels 7-13, although added coupling through $m_1$-$m_2$ may be used. For the lower channels 2-6, coupling between the panel coils at $m_1$-$m_2$ is also relied upon. The relative physical relations of $M_2$, $C_2$ and $m_2$ are similar to that described above for $M_1$ $C_1$ and $m_1$.

The invention panel increment inductor system is also applicable to the oscillator section of the tuner circuit. In FIG. 1 an increment inductor $o$ connected between contacts 47, 48 of panel 40 is a flat preform for oscillator frequency determination for the respective panel. The fixed oscillator inductance coil O is connected in series with increment inductor $o$ through wipers 57, 58. The triode 32 is connected as a Colpitts oscillator, with fixed condensers 66, 67, and the inductances O and $o$ determining the basic frequency of the oscillator. A shunt fine tuning coil 68 and condenser 69 is externally adjustable for the usual fine tune control.

It is to be noted that the oscillator increment $o$ is preferably made to have a minimum inductance equivalent to at least one or even two coil turns in the conventional panel. This is to enable a reasonable frequency adjustment range of the oscillator, in service of the installed television receiver, through an adjacent translatable inductance changing element indicated at 70. Where inductor $o$ is flat, or a preform as illustrated, the element 70 may be a flat or even a round slug. Element 70 may be of brass, ferrite, etc., as is well known. The increments $o$ selectively add inductance to the basic oscillator circuit, so that with fixed coil O that required frequency is determined for the panel. Manual adjustment of fine tuning coil 68 results in the precise frequency, in the conventional manner.

The invention oscillator increment $o$ is stable, and as a flat preform as indicated is accurate, readily installed in production. Within less than up to a two turn coil equivalent inductance range, the inductors $o$ can readily take care of all the upper channel panels 7–13 on a flat preform basis. The corresponding panel coils at $o$ for the lower channel panels 2–6 would in the exemplary tuner require between 7 and 10 turns; such as coils are indicated, though, some turn and panel space savings accrue herein.

The oscillator coupling or injection to the mixer circuit may be relied upon at the panel across increments $o$ and $m_2$; effected by juxtaposing fixed coils O and $M_2$; by a small capacitance coupling condenser indicated at 71; or a combination thereof. The oscillator anode supply is from source $B_1+$, e.g. at 135 volts, through a dropping resistor 72. The screen grid 73 of mixer 65 is connected to $B_1+$ supply voltage through a small inductor 74. The screen grid 75 of RF stage 30 is signal grounded by condenser 76, and supplied by $B_1+$ through resistor 77. The anode 78 of mixer 65 has a tunable output coil 80 tuned for the intermediate frequency signal output, as in the 41 megacycle range. An IF output plug 81 is for external connection. The anode 78 is voltage supplied by the $B_2+$ source through dropping resistor 82.

FIGURES 2 through 5 illustrate typical turret panels constructed in accordance with the present invention for different VHF channel ranges. Panel 100 contains four contact pairs in a longitudinal row. The panel is insertable in position on the turret drum, in a conventional manner (see FIG. 13). A projection 101 at one end inserts in a slot at one drum end, and the aperture 102 receives a latching arm. A rise 103 at aperture 102 seats into a receiving cavity in a drum disc. The turret panel 100 is thus readily inserted and rigidly locked in position on the turret drum for subsequent accurate electrical action with the fixed circuitry. Other panel forms and locking-in means may be used, as for example noted in the patents referred to hereinabove.

Figure 3:
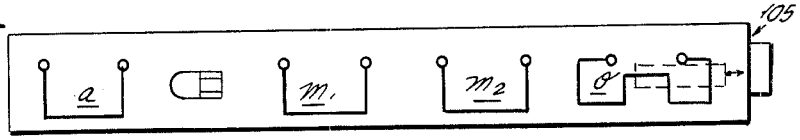

The panel 100 is used for channel 13. It preferably is just short connections across contact pairs for the increments $a$, $m_1$ and $m_2$, for reasons stated above. The $o$ inductor is more sizeable, to about a turn inductance, for coaction with frequency adjusting element 104 indicated in dotted lines, and preferably mounted on the panel (see FIGS. 24–26). Panel 105 of FIG. 3 shows larger increment inductors at $a$, $m_1$, $m_2$ and $o$, than for panel 100. The panel 105 inductor configuration corresponds to the next lower frequency channels 10 to 12. It is to be understood that the actual size, shape, and thickness and orientation of the individual increment inductors $a$, $m_1$, $m_2$ and $o$ on the panels combine to result in the actual inductance addition to their basic fixed coils A, $M_1$, $M_2$ and O to tune in the corresponding channel for each panel. The inductors for the panel 105 range are simple, larger than for panel 100, and also readily preformed.

Figure 4:
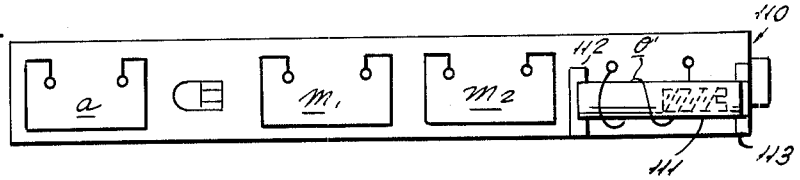

Panel 110 of FIG. 4 is typical of the channel range 7 to 9. It contains still larger flat (or dimensional) increment inductors at $a$, $m_1$, $m_2$ and $o'$. The oscillator inductor $o'$ is shown on a coil form 111 that contains a threaded adjustment slug (not shown). Coil form 111 is mounted between seats 112, 113 moulded in the panel 110. The other inductors on panel 110 may be flat preforms, W-shaped, as shown. If desired, the coil form 111 may be omitted, wherein coil $o'$ may be of stiff wire as a self-supported coil.

Figure 5:
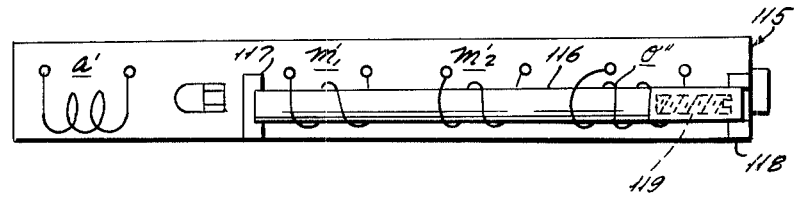

Panel 115 of FIG. 5 uses incremental inductors all of coil form, as for the lower channels 2 to 6. The antenna increment $a$ is a coil without a coil form. A three-coil form 116 is mounted between moulded-in seats 117, 118, and contains the $m_1'$, $m_2'$ and $o''$ coils thereon. A slug 119 is inside the oscillator section coil $o''$. In a typical tuner, where the fixed antenna coil A is six turns, a considerable percentage of the $a'$ coil in the panels 115 is saved, reducing them to each by the order of six turns. Similar savings accrue on the other panel coils for the lower channels 2 to 6, as compared to the prior art. Besides the wire savings, there is a greatly improved space factor saving, permitting smaller panel design.

FIGS. 6 to 9 illustrate several forms for increment inductors usable in the panels as 100, 105, 110 in the $a$, $m_1$, $m_2$ and $o$ positions. Preform 120 is a stiff wire of size and shape to provide a predetermined inductance value between a pair of contact pins (121, 122) on a panel. As desired, wire form may be flat, space curved in three dimensions, or even a stiff coil of one or of few turns. The form ends 123, 123 are arced over to be readily positioned onto the pins before riveting, bonding, etc. The arced ends 123, 123 may be pretinned for ease of electrical bonding through flash heating. Increment 125 is a flat stamping of metal, suitably shaped and of size to produce the requisite incremental inductance for a panel contact pair at its apertures 126, 126. The form ends 127 are pretinned.

Preform 130 of FIG. 8 is flat and larger than forms 120 and 125. It is of generally W-shape, with a greater inherent inductance. Its ends 131, 132 have slits to be slid against a contact pin pair 133, 134. The pins are peened or riveted over the form ends 131, 132 to hold it in place.

FIG. 9 shows a multiple preform assembly 135 containing flat inductors 136, 137, 138. The preformed inductors have apertures at which the contact pins are secured and soldered for firm mechanical and electrical connection. Preform 136, 137, 138 may correspond to the $m_1$, $m_2$ and O coils of a panel such as 105 or 110, and be located on the panel in one operation. The base of unit 135 may be a simple temporary carrier, or a permanent dielectric member.

FIGS. 10 and 11 illustrate the mounting of a flat preform 141 at the antenna inductor ($a$) section of a panel 140. Preform 141 has slots 142, 142 at its ends that fit into contact pins 143, 144. The contact pins 143, 144 are peened over or flattened onto the form ends to secure it in position firmly. The pretinned ends are flash heated or otherwise soldered to the pins.

FIG. 12 shows the top view of a typical turret panel 145 utilizing the present invention. Panel 145 is fabricated of firm dielectric molded material in a conventional manner, contains a longitudinal row of apertures into which the contacts 146 are secured for the increment inductor connections. The end projection 147 is formed with the panel molding, as is the aperture 148 and ridge 149. The panel 145 contains any of the preform or coil inductance increments as disclosed hereinabove, for determining the tuning of the A, $M_1$, $M_2$ and O sections of the tuner circuit for a particular VHF channel. The oscillator frequency slug adjustment is underneath, as indicated in dotted lines at the projection 147 end of the panel. Insertion and locking-in of such panels in a turret drum array is now described.

A typical turret tuner 150 is shown in side view in FIG. 13, containing the turret drum 151. The drum is fastened to a central control shaft 152 rotatably mounted in the end plates 153, 154 of the tuner chassis body. A detent (not shown) positions the drum, when rotated, to precise angular positions for each channel selection. Each panel 155 is firmly mounted and locked in the drum, so that its respective longitudinal row of contacts 156 is engageable with the stationary row of contact wipers 157, in the usual practice for turret tuners. The panels 155 have projections (see FIG. 2) that seat in slots of drum end disc 158. A central disc has spring latches 159 that lock into apertures 160 of the panels.

The fixed turner circuit (see FIG. 1) extends from the wiper panel 161 to inside of the tuner, under the top chassis and tubes 162, 163. The fine tuning control is operated from concentric sleeve 164 on control shaft 152.

The turret panels 155 each individually tunes-in its respective VHF channel, and in the present invention is constructed with the increment inductors as set forth in detail hereinabove. It is to be understood that other tuner forms and arrangements may be used with the panel increment inductor individual channel tuning principle hereof.

An important VHF tuner circuit advantage of the present invention is that it permits the incorporation of an antenna transformer between the antenna input network and the control grid of the RF amplifier. FIG. 14 is a circuit diagram of such application. The antenna lead-in connects to a balanced input network N' containing appropriate traps. The primary winding 176 of an antenna transformer 175 connects to the output terminals network N', and its center tap is signal grounded. The secondary winding 177 is also used as the basis fixed antenna coil (A') for the RF input circuit of the invention incremental inductor system hereof. Coil A' corresponds to the basic fixed antenna input coil A of the FIG. 1 circuit.

The secondary coil A' is proportioned to provide the requisite tuning of the input circuit to grid electrode 181 of RF (tetrode) amplifier 180. The winding 177 has one end signal grounded, and hence tunes with the inherent capacitance ($C_g$) in the grid 181 to ground configuration 1 mainly made of the grid electrode-to-cathode 182 capacity in the tube 180. While a tetrode RF tube 180 is shown, any other suitable VHF amplifier circuit may be used in its stead. The turret panels 185 each contain the corresponding increment inductor ($a'$) to series connect with the fixed antenna coil ($A'$) and establish the optimum tuning across the grid 181 input (with $C_o$) for the panel frequency selection channel.

The increment inductor $a'$ is connected across panel contact pair 186, 187, and is the same as coil $a$ of the FIG. 1 panel 40. Inductor $a'$ connects to the top terminal 178 of secondary coil 177, and to blocking condenser 179 to complete the fixed coil A' to the tube 180 input, and with capacity $C_g$. The remainder of the FIG. 14 tuner circuit is the same as that of FIG. 1: RF output coil $M_1$ tunes with trimmer condenser $C_1$ its circuit to RF anode 183 being completed through increment inductor $m_1$ across panel contacts 188, 189. The mixer input coil $M_2$ tunes with trimmer condenser $C_2$, its circuit to the mixer input lead 190 being completed through increment inductor $m_2$ as in FIG. 1. The similar oscillator section is not shown, but to be understood.

The substantial number of turns with which secondary coil A' can be made in practice, for a good impedance action in the RF input circuit at the upper channels, affords good transformer coupling from the primary winding 176. Such energy transfer is important at the upper channels (7–13) where gain normally falls off in comparison with that of the lower channels (2–6). The transformer 175 windings 176, 177 are preferably closely coupled. The incremental inductors $a'$, $m_1$, $m_2$ and $o$ of the individual panels 185 for the channel selections in the turret tuner are each proportioned to complete the tuner circuit with the respective fixed coils A', $M_1$, $M_2$ and O. In practice, secondary winding 177 contains at least 65% of the turns (inductance) requisite for tuning any of the channels of the whole upper band, thus providing for excellent matching and input coupling for channels 7 through 13, where most needed. Good gain and matching results over all the twelve VHF channels, with excellent selectivity.

The increment panel inductor system of the present invention, as described hereinabove, results in a number of useful and practical advantages in the construction of the turret panels. By substantially reducing the amount of inductance required at each section of each panel, the axial length of the panels may be material reduced over prior constructions. By orienting the preforms in a plane approximating perpendicularity with the panel longitudinal axis, a minimum axial extent results. The lower channel panel coils, with fewer requisite turns using the present invention, also reduce the required axial length. Thus the panel contact pins may be spaced closer than heretofore practical for each of the twelve VHF channels, providing a longitudinally shorter tuner with no compromise in performance.

The smaller turret panel inductances required to tune-in the turner circuit sections embodying the invention fixed coils, permits the use of rugged and sizable preforms as the panel components. These preforms thus can be proportioned with practical tolerances for mass production of the small differential preform inductance values for the successive VHF channels. The resultant preforms are sufficiently accurate to minimize, and in most instances eliminate final test tuning, trimming, crimping, etc. of the panel inductor portions. The smaller coils required in the channel 2 to 6 panels similarly facilitate accuracy in their mass production. This factor, coupled with the lower initial material cost of the inductors used in the invention turret panels, results in marked economy over prior panel constructions. Such savings are significant in television component manufacture.

FIG. 15 is an exterior plan view of an exemplary panel that provides further substantial economies in a VHF television turret tuner, with no change in its channel-to-channel performance. The panel 200 is herein termed a "dual panel" in that it operates successively in two adjacent channel positions in a turret tuner. As will be set forth and described in detail hereinafter, each dual panel hereof is constructed with considerably less material, fabrication and labor than heretofore required for the two individual panels it replaces. The invention dual panels readily fit into conventional turret drum tuners in the location of the two panels they replace, locking-in rigidly for selective operation, with resultant identical performance for both the channels.

A turret tuner can in practice utilize five of the dual panels of this invention to replace ten single chanel panels conventionally used heretofore. One chanel in both the upper and lower VHF bands are retained as individual panels, for the reasons hereinafter stated. A turret tuner could thus employ seven panels to tune-in and otherwise operate each and all of the twelve VHF channels presently extant. A tuner using the invention dual panels would cost considerably less to produce, and yet retain all the well-known practical and operating advantages of the turret type of tuner. The economy factor is a very important one for television tuners, being a mass production item in a competitive field.

The exemplary dual panel 200 has a width that is approximately 75% of the combined width of the two individual panels it replaces. About one-half the width of a single panel is eliminated in the invention dual panel, as indicated by the dotted rectangle 201 in FIG. 15. The longitudinal or axial length of dual panel 200 is made identical to that of the individual panels used in the particular turret tuner in which it is to be used. The area of a dual panel is thus about 50% greater than that of a single channel panel for the tuner, and therefore has a greater overall strength factor. Conventional indexing and latching-in elements are incorporated in the dual panels. Identical elements are used for dual panel 200 as for the single ones, in order that they fit and lock into the common turret drum. Projection 202, aperture 203 and index 204, incorporated in panel 200 is for example made the same as the corresponding elements in the single channel of FIG. 12, for insertion and use in the turret drum, as in drum 151 of turret tuner 150 of FIG. 13.

Dual panel 200 further contains a projection 205 spaced laterally from projection 202, and extending in the same manner. The auxiliary projection 205 is a major fraction of the lateral width of the normal projection 202, being at least one-half in practice. Such width of projection 205 is determined by the location of longitudinal edge 206 of the dual panel. Similarly, an auxiliary aperture 207 and index 208 is laterally opposite aperture 203, terminating at the longitudinal edge 206. The dual panel 200 thus directly fits into the turret drum, as 151 of FIG. 13, in the positions reserved for the two corresponding adjacent channels.

Dual panel 200 is thus mounted in position in the tuner betwen slotted end disc 158 and the latching disc 159" containing spring latches 159, as illustrated in FIG. 15 (see also FIG. 13). Projection 202 fully fits into a corresponding rectangular slot 158' at the peripheral region of disc 158. Auxiliary projection 205 seats into the next slot 158", without necessarily filling it laterally, but fitting fully in the disc radial direction. Similarly, a spring latch 159 projects into aperture 203, and its nib 159' locks onto the surface of index 204, to firmly latch the panel 200 onto the latch disc 159". The underside of shaped index 204 seats into a corresponding detent 209 on the periphery of the latch disc 159". The auxilary aperture 207 receives a latch 159, the nib of which abuts onto its index 208 surface.

While a four element lock-in array is incorporated in the exemplary dual panel 200, it is to be noted that the use of the two main ones 202, 203–204 alone would produce satisfactory mounting of the panel onto the turret drum. Further, where desired, the auxiliary elements 205, 207–208 may be expanded into full size by local bulging of the panel side beyond the longitudinal edge 206. In any event, firm and precise latch-in of the dual panels are thereby simply effected, in their proper channel positions in the normally constructed turret drum. In this way, alternative replacement for any reason by one or two single channel panels may be readily performed. It is thereby also directly feasible to replace any dual panel by a conventional UHF panel for the reception of a UHF channel or channels through the VHF tuner, in established practice. The dual panels of the invention permit full flexibility in the usual design, production and normal utilization of the turret tuners, while still employing the economic advantages that the dual panels afford. While exemplary drum and locking-in panel element arrangements have been shown, it will be understood that other equivalent modes of mounting and demounting the invention dual turret panels may be practiced.

The exemplary dual panel 200 contains two sets of turret contacts 210 and 211, arrayed in two parallel longitudinal rows. The contact rows 210, 211 are laterally spaced for successive channel connection with the fixed wipers of the tuner circuitry, as at 157 in FIG. 13. Corresponding contacts for each dual panel section (A, $M_1$, $M_2$ and O) are directly opposite laterally. The inductances for its upper channel, (e.g. ch. 11), are established on the increment turret panel inductor principle of the invention, as hereinabove set forth. The inductors for the dual panel 200 are connected across paired contacts to complete the tuner circuits for optimum tuning-in of the upper of its paired or adjacent channels. The three dual panel sections A, $M_1$ and $M_2$ for the upper channel (ch. 11) tuning are flat preformed inductors in the manner of the single channel ones as shown in FIGS. 1 and 9. The oscillator (O) dual panel section may also be a flat inductor, as seen for example in FIG. 19, or a helical coil. FIG. 16 shows such coil 212 in end view for dual panel 200, with its associated adjustment slug 213. Coil 212 is end connected to the O contact pair at pins 210'. Inductive links 214 are connected between coil 212 and the opposite contact pins 211' for the tuning-in of the lower adjacent channel, as will be described hereinafter. The flat panel inductors or preforms are indicated in sectional FIG. 17. There illustrated is a preform 216 for $M_1$, connected between the $M_1$ pin sets 210" and 211".

FIG. 18 is an enlarged partial plan view of the interior side of the exemplary dual panel 200. The panel base is made of durable firm low-loss dielectric moldable material. With the major inductance of the tuner tunable circuit sections (A, $M_1$, $M_2$) being fixed through the coils A, $M_1$ and $M_2$ (see FIG. 19), the corresponding panel increment inductors for its A, $M_1$ and $M_2$ portions are small accurate individual flat preforms or stampings 215, 216, 217. The increment panel inductor principle as described hereinabove in connection with FIGS. 1 to 10 is shown combined with the dual panel inductor principle in the FIG. 18 form. The higher channel of the paired panel frequencies (e.g. ch. 11) has its basic incremental inductances proportioned for tuning-in of the A, $M_1$, and $M_2$ circuits, formed in the preform transverse body sections 215a, 216a and 217a respectively. Connection of these respective body sections across the associated channel 11 contact pin pairs provides for the proper tuning-in of the channel.

The tuning-in of the adjacent channel (ch. 10) is accomplished by connecting the basic higher channel body sections 215a, 216a and 217a to the opposite pin pairs by links 215b, 216b and 217b, preferably but not necessarily integral with the respective body sections. By using integral dual preforms as 215, 216, 217 for the A, $M_1$ and $M_2$ panel sections, the paired sets of four contacts for these sections are readily interconnected by single elements. This facilitates mass assembly by mechanized methods, as automation of the dual panels to further reduce their cost. The exemplary preforms of FIG. 18 are W-shaped, but of course may be of other shapes.

The dual preforms 215, 216, 217 have four apertures or slots for registry onto the corresponding contact pins. The contact pins are then riveted or peened over the inserted preforms to firmly fasten them to the panel 200. Use of pretinned "corners" at the preform apertures permits ready electrical bonding or soldering by flash heating to the respective contact pins. The preform arms or links 215b, 216b, 217b individually extend integrally from the respective main inductance portions 215a, 216a, 217a. In this manner, when the higher channel (e.g. ch. 11) section of the dual panel 200 is selected for tuning through the row of contact pins 210, only the main inductance portions 215a, 216a, 217a are in circuit connection, to effect the predetermined tuning for that channel.

When the adjacent lower channel (e.g. ch. 10) contact pins 211 are connected in the tuner circuit, both the main inductances 215a, 216a, 217a and their links 215b, 216b, 217b are entered into the circuit. Each dual inductor or preform 215, 216, 217 thereupon has its main inductance portion and its two links arranged in series circuit relation in the tuner circuitry A, $M_1$, $M_2$. By suitably proportioning the inductance of each link, the composite inductance produced by such serial connection of the dual inductors 215, 216, 217 produces the optimum tuning in each circuit section A, $M_1$, $M_2$ for the lower channel (ch. 10) of the dual panel.

In a similar manner the other dual panels for the tuner comprise a pair of adjacent channels, with the lower channel tuning inductors provided through short inductive connections or links between laterally opposite contact pins. The oscillator section O of the tuner may coact with coil inductors in the dual panels, even though the A, $M_1$ and $M_2$ sections use flat ones, as noted in FIGS. 16 and 17. Also, flat oscillator inductor portions for the panel may be used, as described in connection with FIGS. 23 to 25 hereinafter.

As noted, the exemplary dual (and single) panels for the turret tuner utilize the chassis fixed A, $M_1$, $M_2$ and O coils, to take advantage of the space, cost and fabrication advantages of the incremental panel inductor principles hereof. Such advantages accrue even though coil inductors are used in the panel, as for the lower channels 2 to 6. When combined with the short inductive links, the over-all result herein set forth enhances these advantages, in the invention dual panel system. In FIG. 18 dotted fins 219, 219 are shown interconnecting adjacent preforms 215–216 and 216–217. This arrangement or web permits group stamping and registry of the preforms. After attachment to the panel pins the fins 219, 219 are simply severed, leaving the preforms as independent panel elements.

FIG. 19 is a schematic diagram of a VHF television tuner circuit, the fixed chassis circuitry being the same as that of FIG. 1, utilizing a dual turret panel 220. Dual panel 220 is similar to panel 200 of FIGS. 15 to 18, but shown using a flat preformed oscillator inductor 218. The antenna (A') section preform 215 of panel 220 is connected into the RF amplifier 30 input circuit through contact wipers 51, 52, in series between the antenna coupling condenser 39, network N, and the fixed A coil that connects to the control grid 60. In the illustrated lower adjacent channel position (e.g. ch. 10) the panel contacts 221, 222 connect both the inductive links 215b, 215b and the main inductive portion 215a in series with the A coil circuit. The net effective inductance of the whole dual preform 215 thus connected is proportioned to provide optimum tuning of the RF input to tube 30 for the indicated channel (ch. 10).

On the other hand when dual panel 220 is positioned for the higher channel (e.g. ch. 11) operation, the opposite contact pin pair 231, 232 instead connect with wipers 51, 52. In such mode only the main preform inductance portion 215a is circuitally in connection with the RF input circuit and coil A. The links 215b, 215b are free-ended, open-ended, and are not in circuit in this circuit mode. The inductance of the main preform position 215a is proportioned to tune-in at optimum the RF input circuit to the higher of the adjacent channels (ch. 11). The tuning operation of the A' preform 215 is thus optimum for each of the paired channels for which it is selectively proportioned.

In a similar manner, the interstage and the oscillator dual panel dual preforms or inductors 216, 217, 218, provide optimum operation for the tuner circuit at each of its predetermined two adjacent channel frequencies. The RF tube output tank circuit $M_1'$–$C_1$ is connectible to the $M_1$ dual preform 216 through wipers 53, 54. For the lower channel (ch. 10) illustrated, the dual panel contacts 223, 224 connect through wipers 53, 54 the whole inductance of the dual preform 216 composed of main portion 216a and inductive links 216b, 216b in series therewith. Tank circuit $M_1$–$C_1$ is thereby tuned for optimum at the corresponding channel 10.

With the dual panel connected in the channel 11 mode its contacts 233, 234 instead connect only the central body portion 216a of the dual inductor 216 into the RF output circuit $M_1$–$C_1$ to tune it for channel 11 operation. The lower channel (10) six-megacycle broadcast band (192 to 198 mc.) is six megacycles below that of channel 11. The inductance links 216b, 216b add incrementally an inductance amount to that of central portion 216a wherein the tuning resonance inclusive of the inductance $M_1$, capacitance setting of $C_1$ and the inherent circuit values, results in the desired tuned-in frequency band for the lower channel 10, as will now be understood by those skilled in the art.

The second interstage dual inductor $M_2'$, preform 217, functions similarly to that described for inductor 216, being selectively connectible into the $M_2$–$C_2$ tunable circuit for the mixer (31) input grid 63. The oscillator dual inductor O', preform 218, is correspondingly connectible, selectively for either adjacent channel into the O tank circuit inclusive of the O fixed coil, through contact wipers 57, 58. The incremental inductance links 218b, 218b add inductance to the basic central portion 218a (for ch. 11) to derive the requisite oscillator frequency for the lower channel 10. The common adjustable slug 219 is used to adjust the oscillator frequency for both the paired channels; and in view of the precise incremental link inductors 218b, 218b both channels are correct when one of them is adjusted.

In the exemplary turret tuner, each of the five dual panel constructions require at most the equivalent total inductance of two normal coil turns in any set of links between opposite contact pin pairs. For the three exemplary upper channel dual panels all the link pairs (as for 215b, 216b etc.) required a total inductance increment equivalent to less than one normal coil turn. Also the majority of the preform central portions (215a, 216a, etc.) required not over about a "one turn" inductance increment. In the invention arrangement for the dual panels, substantial, rugged and accurate preforms are thus practical for mass production, to provide adjacent lower paired channels with negligable trimming or crimping subsequent to preform assembly. With a ⅜" lateral spacing between opposite contact pins on the exemplary dual panels precise, automated dual inductance sections are readily accomplished with such preformed elements (as 215, 216 etc.). Should coil lateral linkage be desired in lower channel (2–6) dual panels, stiff wire coils or space-formed inductors can be used herein in view of their small size to afford similar mass production accuracy and economy.

The important advantages of the invention turret panel system is the substantial savings in materials, great reduction in overall panel windings and wire requirement, simpler and cheaper assembly and fabrication of the inductor system therefor, and permanent rugged precise inductances for the panel tuning-in function. Further, there is minimum factory tuning or adjusting of the inductor sections of these panels needed. This is because the inductors have relatively small inductance values in the invention turret circuit system and in contrast are formed with flat relatively sizable areas. The basic tuning of the turret tuner tunable sections using the herein flat inductor panel sections, instead of coils, results in accurate fabrication of the inductances thereon to a degree heretofore unattainable. In fact the increment inductor turret system hereof renders practical printing or printed circuit techniques for many sections of the single and dual panels hereof. This again is feasible because of the relatively small incremental inductances practical for use in most of the turret panel inductor sections, and the correspondingly large area available for their assembly or fabrication.

The significant contribution of the present invention, is the use of stationary coils that form a major portion of the requisite inductance in the plurality of the stationary tunable circuit sections, whereby the selectively and directly connected panel inductance increments produce stable circuit sections optimized for tuning-in the channels.

FIG. 20 is a drum diagram using dual panels, with five duel channel panels and two single channel panels for tuning-in of all the assigned twelve VHF channels. The upper VHF band of seven channels (7–13) are, in the exemplary turret tuner, covered by the three dual channel panels 8/9, 10/11 and 12/13, and a single channel panel for ch. 7. These upper band panels are shown on the turret drum 250 in their peripheral locations. The contact rows for each channel are at the precise angular positions as though all single channels were used. The lower VHF band channels (2–6) are therein covered by two dual channel panels 3/4 and 5/6, and a single channel panel for channel 2. Should it be desired, the lower channels 2 to 6 may all be individual single width panels.

In the exemplary drum 250 provision is made at the "channel No. 1" location (between channels 2 and 13) for a single width panel arranged to convert the tuner to a two-stage IF (40 mc.) amplifier, for external UHF tuning reception. There thus are thriteen requisite equal angular, detented, rotational poistions to accommodate the VHF channels and the conversion position (ch. 1). The successive contact rows, for individual coaction with the contact wipers 51–58 of the turret tuner, are spaced angularly about their drum positions by 27.7°; and at equal radial locations from the drum shaft 251. The two adjacent contact rows in each of the dual panels are thus oriented to be 27.7° apart when mounted on the drum periphery, as indicated by 0° in the diagram.

It is noted that spaces 252 occur at the five peripheral drum points where the dual panels are narrowed. Adjacent the spaces 252 the dual panels each have an oscillator slug adjusting element *s* used for their paired channels. The net of seven slugs *s* are satisfactory to manually sharply tune the oscillator adjustments for all the twelve VHF channels in the dual panel system hereof. The spaces 252 represent savings in material. The contact wipers 51–58 are transverse loops, readily riding over the spaces 252 and in no way hindering their function.

FIGS. 21 and 22 illustrate a modified dual channel panel construction utilizing two independent oscillator adjusting elements for the paired channels. The dual panel 260 is basically the same in form, arrangement, circuit elements and purpose as the dual panels hereinabove described, with the addition of a second oscillator coil adjustment element for the lower channel position. The main panel width W is the same as for example as that of dual panel 200 of FIG. 15, namely about 75% of that for two single panels. The higher of the paired channels (e.g. ch. 11) has its contact row 261; and the laterally spaced contact row 262, for the adjacent lower channel (ch. 10). The other dual channel panels are made similarly.

The dielectric body of dual panel 260, as also that of dual panel 200 is integral, supporting both contact rows, at the requisite lateral separation and angle (0°) of orientation for nominal coaction with the contact wipers (51–58) with the contact heads, and their registry through the tuner detent action. The latch apertures 263, 264 and the end projection 265 for lock-in of duel panel 260 in the turret drum are the same as those of dual panel 200. However, to accommodate the second oscillator adjusting element the corresponding O' end section 270 of the panel 260 is made wider than W, as illustrated. This permits a full width lock-in projection 266 for the panel.

As seen in end view FIG. 22, two separate coils 271, 272 are used as separate oscillator panel elements, although flat coils or preforms may instead be employed therein. Coil 271 has its ends connected to contacts 261'; and coil 273, to contacts 262'. Each oscillator coil has a respective adjustment slug 273, 274. The two coils 271, 272 and their end slotted slugs 273, 274 are oriented in the normal angular position for independent channel adjusting as is conventional for single panels. The same flexibility of direct independent oscillator frequency adjustment at all twelve channel positions of the tuner is thus provided by this dual panel form 260. The oscillator coils 271, 272 are proportioned to tune with the fixed oscillator circuit to provide the corresponding frequencies when in selection position. The remaining inductance elements of dual panel 260 are the preforms described for dual panel 200, and are respectively connected to the contacts 261, 262.

FIGS. 23, 24 and 25 illustrate alternate oscillator adjusting slug arrangements for the invention turret panels wherein flat oscillator inductors are used. These are applicable for either the single or dual panel configurations hereof. FIG. 23 illustrates panel 280 with a flat oscillator coil or a preform 281. A tubular form 282 is mounted under preform 281, between two integral supports 283, 284, and contains a threaded metal slug 285. Form 282 holds and guides slug 285 in a conventional manner. Mount 284 may be formed as an end-stop for the slug 285. The inductance 281 is independent of the form 282, but is adjacent to it and the axial path of the slug 285. Flat inductor 286 is the interstage $M_2'$ mixer section; the others not shown are understoood. Inductor 281 is connected to the O section panel contacts 287.

In FIG. 24, turret panel 290 has a flat inset oscillator inductor 291 in connection with contacts 292. An integral molded projection 293 extends below the panel O end, through which a thread bore receives the threaded slug 294. Slug 294 is thus movable adjacent inductor 291 to adjust its effective inductance for the tuner oscillator circuit. A molded-in stop 295 prevents turning of the slug out of its mounting 293. FIG. 25 illustrates a further turret panel form 300. A tubular unit 301, which may be of metal is supported below the panel O end by a pin 302 anchored in an aperture thereof. The tube 301 is threaded to carry slug 303. A slug end stop 304 is molded in the panel. The flat oscillator inductor 305 is supported in the panel O end, and coacts with adjustable slug 303.

Although the present invention has been described in connection with exemplary embodiments thereof, it is to be understood that variations and modifications may be made by those skilled in the art without departing from the broader spirit and scope of the invention, as set forth in the following claims.

I claim:
1. A television VHF turret tuner with a chassis containing stationary tuner circuitry and a longitudinal row of contact wipers, said stationary circuitry including a plurality of tunable sections operable in common for determining the tuned-in reception of channels by the tuner, each of the stationary tunable sections having the predetermined stationary inductor in its circuit proportioned to provide a predominant portion of the total inductance requisite therein for the tuning-in of the highest of the VHF channels, each of the stationary tunable sections being in individual connection with said contact wipers, a rotatable drum with mountable panels positionable for selectively and directly tuning-in the channels individually, each panel having a longitudinal row of contacts for selective electrical coaction with said contact wipers, and increment inductors secured in each of said panels in individual connection with respective panel contacts for selective connection with the corresponding stationary inductors of the common stationary tunable sections, the increment inductors of the positionable panel for tuning-in the said highest VHF channel constituting minor portions of the respective requisite inductance totals of said tunable sections, and each of the said increment inductors of each remaining panel being individually proportioned to series supplement the said inductance of its corresponding stationary inductor in the associated common tunable section for directly optimizing each of said tunable sections for selective tuning-in of the channel predetermined for the respective panel, whereby the physical size and inductance of the increment inductors requisite for all said positionable panels are of substantially minimal value for the tuning-in of their respective channels.

2. A television VHF turret tuner as claimed in claim 1, in which said positionable panel for the highest VHF channel has a plurality of its increment inductors in substantially linear form.

3. A television VHF turret tuner as claimed in claim 1, in which said positionable panel for the highest VHF channel has a plurality of its increment inductors in substantially straight form.

References Cited by the Examiner
UNITED STATES PATENTS

| | | | |
|---|---|---|---|
| 2,789,227 | 4/1957 | Murakami et al. | |
| 2,808,515 | 10/1957 | Nestlerode et al. | |
| 2,811,637 | 10/1957 | O'Brien | 334—49 X |
| 2,843,829 | 7/1958 | Slate | 336—200 |
| 2,868,985 | 1/1959 | Carlson | 334—49 |
| 2,898,465 | 8/1959 | Carlson | 334—49 |
| 2,898,563 | 8/1959 | De Cola et al. | |
| 2,911,605 | 11/1959 | Wales | 336—200 |

HERMAN KARL SAALBACH, *Primary Examiner.*

SAMUEL B. PRITCHARD, BENNETT G. MILLER,
*Examiners.*